US008589203B1

(12) United States Patent
Collins et al.

(10) Patent No.: US 8,589,203 B1
(45) Date of Patent: Nov. 19, 2013

(54) PROJECT PIPELINE RISK MANAGEMENT SYSTEM AND METHODS FOR UPDATING PROJECT RESOURCE DISTRIBUTIONS BASED ON RISK EXPOSURE LEVEL CHANGES

(75) Inventors: Gregory D. Collins, Alexandria, VA (US); Thomas Torbinski, Leesburg, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 613 days.

(21) Appl. No.: 12/348,731

(22) Filed: Jan. 5, 2009

(51) Int. Cl.
 *G06Q 10/00* (2012.01)
(52) U.S. Cl.
 USPC ................. 705/7.12; 705/7.22; 705/7.23
(58) Field of Classification Search
 None
 See application file for complete search history.

(56) References Cited

U.S. PATENT DOCUMENTS

| | | | |
|---|---|---|---|
| 6,324,647 B1 | 11/2001 | Bowman-Amuah | |
| 6,578,005 B1 * | 6/2003 | Lesaint et al. | 705/7.14 |
| 6,662,357 B1 | 12/2003 | Bowman-Amuah | |
| 7,051,036 B2 | 5/2006 | Rosnow et al. | |
| 7,058,588 B2 | 6/2006 | Young et al. | |
| 7,086,057 B2 * | 8/2006 | Hayashi | 718/102 |
| 7,117,161 B2 | 10/2006 | Bruce | |
| 7,318,039 B2 * | 1/2008 | Yokota et al. | 705/7.17 |
| 7,366,680 B1 * | 4/2008 | Creel et al. | 705/7.17 |
| 7,430,498 B2 | 9/2008 | Butterfield et al. | |
| 7,559,049 B1 | 7/2009 | Hemmat et al. | |
| 7,698,148 B2 | 4/2010 | Lavu et al. | |
| 7,730,123 B1 | 6/2010 | Erickson et al. | |
| 7,774,743 B1 * | 8/2010 | Sanchez et al. | 717/103 |
| 7,818,288 B1 | 10/2010 | Dickson et al. | |
| 7,890,545 B1 | 2/2011 | Cason, Jr. et al. | |
| 7,908,167 B1 | 3/2011 | Crum et al. | |
| 8,000,992 B1 | 8/2011 | Marchbanks et al. | |
| 8,005,706 B1 | 8/2011 | Cassone et al. | |
| 2001/0041999 A1 | 11/2001 | Young et al. | |
| 2002/0026630 A1 | 2/2002 | Schmidt et al. | |
| 2002/0042731 A1 | 4/2002 | King, Jr. et al. | |
| 2002/0059512 A1 | 5/2002 | Desjardins | |
| 2003/0014409 A1 * | 1/2003 | Shukoor | 707/7 |

(Continued)

FOREIGN PATENT DOCUMENTS

JP 2001195483 A * 1/2000 ............. G06Q 10/00

OTHER PUBLICATIONS

Banks et al, Practical Risk Management, John Wiley&Sons Ltd, ISBN 0470849673, (selection) 2003.*

(Continued)

*Primary Examiner* — Lynda Jasmin
*Assistant Examiner* — Octavian Rotaru

(57) ABSTRACT

A system is provided for project pipeline risk management. A distribution tool generates project resource distributions for associated organizations, wherein each of the project resource distributions comprises allocations of project resources to project phases and corresponds to one of multiple projects. The risk tool identifies risks, wherein each of the identified risks corresponds to one of the projects. The risk tool determines an initial risk exposure for each project based on an initial probability for each identified risk and an initial impact severity for each identified risk. The risk tool determines an updated risk exposure for each project based on an updated probability for each identified risk and an updated impact severity for each identified risk. The distribution tool generates updated project resource distributions based on the completed project information and a difference between the initial risk exposure and the updated risk exposure for each project.

17 Claims, 9 Drawing Sheets

(56) References Cited

U.S. PATENT DOCUMENTS

| | | |
|---|---|---|
| 2003/0033191 A1 | 2/2003 | Davies et al. |
| 2003/0106039 A1 | 6/2003 | Rosnow et al. |
| 2003/0110067 A1 | 6/2003 | Miller et al. |
| 2003/0225605 A1* | 12/2003 | Yokota et al. ............ 705/7 |
| 2004/0030992 A1 | 2/2004 | Moisa et al. |
| 2004/0054565 A1 | 3/2004 | Nemecek et al. |
| 2004/0059589 A1* | 3/2004 | Moore et al. ............ 705/1 |
| 2004/0143811 A1 | 7/2004 | Kaelicke et al. |
| 2005/0060213 A1* | 3/2005 | Lavu et al. ............ 705/7 |
| 2005/0114829 A1* | 5/2005 | Robin et al. ............ 717/101 |
| 2005/0149370 A1 | 7/2005 | Brown |
| 2005/0197845 A1 | 9/2005 | Wachter et al. |
| 2005/0197952 A1* | 9/2005 | Shea et al. ............ 705/38 |
| 2005/0216111 A1 | 9/2005 | Ooshima et al. |
| 2006/0053043 A1 | 3/2006 | Clarke |
| 2006/0095309 A1 | 5/2006 | Mangan et al. |
| 2006/0184371 A1* | 8/2006 | Tsalakopoulos ............ 705/1 |
| 2006/0190391 A1 | 8/2006 | Cullen, III et al. |
| 2007/0038490 A1 | 2/2007 | Joodi |
| 2007/0271198 A1* | 11/2007 | Del Bianco et al. ........ 705/36 R |
| 2007/0276674 A1 | 11/2007 | Hemmat |
| 2007/0299707 A1 | 12/2007 | Bentsen et al. |
| 2008/0103859 A1* | 5/2008 | Yokota et al. ............ 705/7 |
| 2008/0312983 A1* | 12/2008 | Chakka ............ 705/7 |
| 2008/0313008 A1 | 12/2008 | Lee et al. |
| 2008/0313596 A1 | 12/2008 | Kreamer et al. |
| 2009/0055237 A1 | 2/2009 | Henry et al. |
| 2009/0063223 A1* | 3/2009 | Elwell et al. ............ 705/7 |
| 2009/0070188 A1* | 3/2009 | Scott et al. ............ 705/10 |

OTHER PUBLICATIONS

Chapman et al, Project Risk Management, John Wiley & Sons Ltd, ISBN 0470853557(selection), 2003.*
Clarity, Functional Overview of CA Clarity Project and Portfolio Management System, 2006.*
Cooper et al, Project Risk Management Guidelines, John Wiley & Sons Ltd, ISBN 0470022817, (selection), 2005.*
Greer et al, Building Sustainable Sarbanes-Oxley Management Processes, NIKU 2005 Global User Conferance, 2005.*
Institute of Management Accountants, Enterprise Risk Management Tools and Techniques for Effective Implementation, May 2007.*
Marmel, Elaine, Microsoft Project 2007 Bible, Wiley Publishing, ISBN 0470009926, (selection) 2007.*
Microsoft Office Project Portfolio Server 2007, published by Microsoft Corporation 2006.*
Marmel, Elaine, Microsoft Project 2007 Bible, Wiley Publishing, ISBN 0470009926 (complete), 2007.*
Microsoft Office Project Portfolio Server 2007, published by Microsoft Corporation 2006 https://www.am.ohio.gov/PortfolioServer/Manuals/MOPPS-Optimizer.pdf.*
JP2001195483A, translation of the Japanese patent.*
Institute of Management Accountants, Enterprise Risk Management: Tools and Techniques for Effective Implementation, 2007.*
Brillinger David, Time Series General, University of California, Berkely, 2007 http://www.stat.berkeley.edu/~brill/Papers/encysbs.pdf.*

"A Comprehensive, best-practices approach to business resilience and risk mitigation," IBM Governance and Risk Management, Sep. 2007.
"IT Governance—Value for the Business," Project Challenge Expo, Sep. 19-20, 2007, London.
"An Introduction to Project Management," Cultural Consortium Ltd., 2005.
Shenkir, William G., et al., "Enterprise Risk Management: Tools and Techniques for Effective Implementation," Institute of Management Accountants, 2007.
Somers, Toni M., et al., "The Impact of Critical Success Factors across the Stages of Enterprise Resource Planning Implementation," Proceedings of the 34th Hawaii International Conference on System Sciences, 2001.
Walker, Mike, "Integration of Enterprise Architecture and Application Portfolio Management," http://msdn.microsoft.com/en-us/library/bb896054(d=printer).aspx, Oct. 2007.
Notice of Allowance dated Apr. 15, 2011, U.S. Appl. No. 11/833,544.
Notice of Allowance dated Apr. 22, 2011, U.S. Appl. No. 11/833,555.
Crum, James L., et al., "Spreading Algorithm for Work and Time Forecasting," U.S. Appl. No. 11/195,964, filed Aug. 3, 2005.
Cassone, Deandra, et al., "Risk Management in Project Management," U.S. Appl. No. 11/833,544, filed Aug. 3, 2007.
Kanemoto, Michael W., et al., "Hardware/Software and Vendor Labor Integration in Pipeline Management," U.S. Appl. No. 11/403,652, filed Apr. 13, 2006.
Knauth, Margaret, et al., "A Method and Software Tool for Real-Time Optioning in a Software Development Pipeline," U.S. Appl. No. 11/403,773, filed Apr. 13, 2006.
Knauth, Margaret, et al., "Predictive Growth Burn Rate in Development Pipeline," U.S. Appl. No. 11/403,669, filed Apr. 13, 2006.
Knauth, Margaret, et al., "Project Pipeline Management Systems and Methods Having Capital Expenditure/Expense Flip Targeting," U.S. Appl. No. 11/403,701, filed Apr. 13, 2006.
Marchbanks, Noel, et al., "System and Method for Project Management in Plan Workbook," U.S. Appl. No. 11/833,555, filed Aug. 3, 2007.
Hillson, David, "Using a Risk Breakdown Structure in Project Management," Research Paper, Mar. 2003, Henry Stewart Publications 1472-5967, Journal of Facilities Management, vol. 2, No. 1, pp. 85-97.
Project Management Institute, "A Guide to the Project Management Body of Knowledge Third Edition (PMBOK®Guide)," Project Management Institute, Inc., Newtown Square, Pennsylvania, 2004.
Office Action dated Aug. 25, 2010, U.S. Appl. No. 11/833,544.
Office Action dated Sep. 3, 2010, U.S. Appl. No. 11/833,555.
Advisory Action dated Mar. 3, 2011, U.S. Appl. No. 11/833,555.
Barkley Sr., Bruce T., "Integrated Project Management," 2006, McGraw-Hill Companies, Inc., USA.
Mentz, G., et al., "Project Management Guide," Nov. 18, 2005, International Project Management Commission; American Academy of Project Management.
Final Office Action dated Dec. 9, 2010, U.S. Appl. No. 11/833,544.
Final Office Action dated Dec. 28, 2010, U.S. Appl. No. 11/833,555.

* cited by examiner

300

| Project phase when status turned Red 302 | Frequency in historical data 304 | On Time 306 | Likelihood project misses commit date 308 | Possible impact to levels of effort 310 |
|---|---|---|---|---|
| Analysis 312 | 1 out of 1 | 100% | Low | Probably No change |
| Design 314 | 3 out of 4 | 75% | Medium | Probably change |
| Development 316 | 1 out of 1 | 100% | Low | Probably No change |
| Test 318 | 2 out of 6 | 33% | High | Probably No change |
| Launch 320 | 0 out of 2 | 0% | High | Probably change |
| Overall 322 | 7 out of 14 | 50% | Medium | Probably change |

| Project phase when status turned Yellow 402 | Frequency in historical data 404 | On Time 406 | Likelihood project misses commit date 408 | Possible impact to levels of effort 410 |
|---|---|---|---|---|
| Analysis 412 | 5 out of 5 | 100% | Low | Probably No change |
| Design 414 | 19 out of 20 | 95% | Low | Probably change |
| Development 416 | 5 out of 5 | 100% | Low | Probably No change |
| Test 418 | 14 out of 30 | 47% | Medium | Probably No change |
| Launch 420 | 4 out of 10 | 40% | High | Probably change |
| Overall 422 | 47 out of 70 | 67% | Medium | Probably change |

| Probability 502 | Estimation of Probability 508 |
|---|---|
| 10% | The risk has a very low probability of occurring |
| 25% | The risk has a low probability of occurring (one in four chances) |
| 50% | The risk has an equal probability of occurring (one in two chances) |
| 75% | The risk has a high probability of occurring (three in four chances) |
| 90% | The risk has a very high probability of occurring |

| Impact Severity 504 | Very Low 510<br>1 | Low 512<br>2 | Moderate 514<br>3 | High 516<br>4 | Very High 518<br>5 |
|---|---|---|---|---|---|
| Cost 520 | Insignificant Cost Increase | Less than 5% Cost Increase | 5-10% Cost Increase | 10-20% Cost Increase | Greater than 20% Cost Increase |
| Schedule 522 | Schedule Slippage is Insignificant | Schedule Slippage is less than 5% | Schedule Slippage is 5-10% | Schedule Slippage is 10-20% | Schedule Slippage is Greater than 20% |
| Scope 524 | Scope Increase or Reduction is Insignificant | Scope Increase or Reduction is Low | Scope Increase or Reduction is Moderate | Scope Increase or Reduction is High | Scope Increase or Reduction is Very High |
| Quality 526 | Quality Reduction is Insignificant | Quality Reduction is Low | Quality Reduction is Moderate | Quality Reduction is High | Quality Reduction is Very High |

| Risk Exposure 506 | 10% Probability | 25% Probability | 50% Probability | 75% Probability | 90% Probability |
|---|---|---|---|---|---|
| Impact 5 | Green .50 | Yellow 1.25 | Yellow 2.50 | Red 3.75 | Red 4.50 |
| Impact 4 | Green .40 | Yellow 1.00 | Yellow 2.00 | Red 3.00 | Red 3.60 |
| Impact 3 | Green .30 | Green .75 | Yellow 1.50 | Yellow 2.25 | Red 2.70 |
| Impact 2 | Green .20 | Green .50 | Yellow 1.00 | Yellow 1.50 | Yellow 1.80 |
| Impact 1 | Green .10 | Green .25 | Green .50 | Green .75 | Green .90 |

| Ringtone Project Deliverables 602 | Weight 604 | Service Delivery 606 | Network Operations 608 | Network Engineering 610 | Management Network Operations 612 | Network Development 614 | Field Engineering Operations 616 |
|---|---|---|---|---|---|---|---|
| Requirements Traceability 618 | 3 | R | A | CI | R | R | R |
| Architecture Requirements 620 | 3 | R | A | R | CI | R | R |
| Engineering Requirements 622 | 2 | R | R | A | CI | R | CI |
| DTS 624 | 3 | CI | R | CI | CI | R | A |
| Design Requirements 626 | 3 | R | R | A | R | A | R |
| DIT 628 | 2 | CI | CI | CI | R | A | R |
| ASD 630 | 1 | CI | CI | R | A | R | CI |

Fig. 6B

| Ringtone Project Deliverables 602 | Weight 604 | Service Delivery 606 | Network Operations 608 | Network Engineering 610 | Management Network Operations 612 | Network Development 614 | Field Engineering Operations 616 |
|---|---|---|---|---|---|---|---|
| Requirements Traceability 618 | 3 | 2 | 3 | 1 | 2 | 2 | 2 |
| Architecture Requirements 620 | 3 | 2 | 3 | 2 | 1 | 2 | 2 |
| Engineering Requirements 622 | 2 | 2 | 2 | 3 | 2 | 2 | 1 |
| DTS 624 | 3 | 1 | 2 | 1 | 2 | 3 | 3 |
| Design Requirements 626 | 3 | 2 | 2 | 3 | 2 | 3 | 2 |
| DIT 628 | 2 | 1 | 1 | 1 | 2 | 3 | 2 |
| ASD 630 | 1 | 1 | 1 | 2 | 3 | 2 | 1 |

Fig. 6C

| Ringtone Project Deliverables 602 | Weight 604 | Service Delivery 606 | Network Operations 608 | Network Engineering 610 | Management Network Operations 612 | Network Development 614 | Field Engineering Operations 616 |
|---|---|---|---|---|---|---|---|
| Requirements Traceability 618 | 3 | 6 | 9 | 3 | 6 | 6 | 6 |
| Architecture Requirements 620 | 3 | 6 | 9 | 6 | 3 | 6 | 6 |
| Engineering Requirements 622 | 2 | 4 | 4 | 6 | 2 | 4 | 2 |
| DTS 624 | 3 | 3 | 6 | 3 | 3 | 6 | 9 |
| Design Requirements 626 | 3 | 6 | 6 | 9 | 6 | 9 | 6 |
| DIT 628 | 2 | 2 | 2 | 2 | 4 | 6 | 4 |
| ASD 630 | 1 | 1 | 1 | 2 | 3 | 2 | 1 |

Fig. 7A

| Network Development Ringtone Project Deliverables 702 | Concept Phase 704 | Analysis Phase 706 | Design Phase 708 | Development Phase 710 | Test Phase 712 | Launch Phase 714 |
|---|---|---|---|---|---|---|
| Requirements Traceability 716 | 100% | 0% | 0% | 0% | 0% | 0% |
| Architecture Requirements 718 | 80% | 20% | 0% | 0% | 0% | 0% |
| Engineering Requirements 720 | 0% | 50% | 50% | 0% | 0% | 0% |
| DTS 722 | 0% | 0% | 60% | 40% | 0% | 0% |
| Design Requirements 724 | 0% | 0% | 50% | 50% | 0% | 0% |
| DIT 726 | 0% | 0% | 0% | 80% | 20% | 0% |
| ASD 728 | 0% | 0% | 0% | 50% | 50% | 0% |
| Phase Total 730 | 100% | 100% | 100% | 100% | 100% | 100% |

Fig. 7B

| Network Development Ringtone Project Deliverables 702 | Concept Phase 704 | Analysis Phase 706 | Design Phase 708 | Development Phase 710 | Test Phase 712 | Launch Phase 714 |
|---|---|---|---|---|---|---|
| Requirements Traceability 716 | 6 | 0 | 0 | 0 | 0 | 0 |
| Architecture Requirements 718 | 4.8 | 1.2 | 0 | 0 | 0 | 0 |
| Engineering Requirements 720 | 0 | 2 | 2 | 0 | 0 | 0 |
| DTS 722 | 0 | 0 | 3.6 | 2.4 | 0 | 0 |
| Design Requirements 724 | 0 | 0 | 4.5 | 4.5 | 0 | 0 |
| DIT 726 | 0 | 0 | 0 | 4.80 | 1.2 | 0 |
| ASD 728 | 0 | 0 | 0 | 1 | 1 | 0 |
| Phase Total 730 | 10.8 | 3.2 | 10.1 | 12.7 | 2.2 | 0 |

Fig. 8A

| Organizations 202 | Pipeline Hours 204 | Concept Phase 206 | Analysis Phase 208 | Design Phase 210 | Development Phase 212 | Test Phase 214 | Launch Phase 216 |
|---|---|---|---|---|---|---|---|
| Service Delivery 218 | 80 | 15% | 20% | 15% | 15% | 15% | 20% |
| Network Operations 220 | 160 | 30% | 30% | 10% | 10% | 10% | 10% |
| Network Engineering 222 | 140 | 15% | 15% | 30% | 15% | 15% | 10% |
| Management Network Operations 224 | 140 | 10% | 25% | 20% | 15% | 15% | 15% |
| Network Development 226 | 100 | 27.7% | 8.2% | 25.9% | 32.6% | 5.6% | 0% |
| Field Engineering Operations 228 | 120 | 10% | 10% | 10% | 10% | 20% | 40% |

Fig. 8B

| Organizations 202 | Pipeline Hours 204 | Concept Phase 206 | Analysis Phase 208 | Design Phase 210 | Development Phase 212 | Test Phase 214 | Launch Phase 216 |
|---|---|---|---|---|---|---|---|
| Service Delivery 218 | 80 | 12 | 16 | 12 | 12 | 12 | 16 |
| Network Operations 220 | 160 | 48 | 48 | 16 | 16 | 16 | 16 |
| Network Engineering 222 | 140 | 21 | 21 | 42 | 21 | 21 | 14 |
| Management Network Operations 224 | 140 | 14 | 35 | 28 | 21 | 21 | 21 |
| Network Development 226 | 100 | 27.7 | 8.2 | 25.9 | 32.6 | 5.6 | 0 |
| Field Engineering Operations 228 | 120 | 12 | 12 | 12 | 12 | 24 | 48 |

PROJECT PIPELINE RISK MANAGEMENT SYSTEM AND METHODS FOR UPDATING PROJECT RESOURCE DISTRIBUTIONS BASED ON RISK EXPOSURE LEVEL CHANGES

CROSS-REFERENCE TO RELATED APPLICATIONS

This application includes subject matter related to U.S. patent application Ser. No. 11/195,964 filed Aug. 3, 2005, entitled "Spreading Algorithm for Work and Time Forecasting" by James L. Crum, et al.; U.S. patent application Ser. No. 11/403,669 filed Apr. 13, 2006, entitled "Predictive Growth Burn Rate in Development Pipeline" by Margaret Knauth, et al.; U.S. patent application Ser. No. 11/403,773 filed Apr. 13, 2006, entitled "A Method and Software Tool for Real-Time Optioning in a Software Development Pipeline" by Margaret Knauth, et al.; U.S. patent application Ser. No. 11/403,652 filed Apr. 13, 2006, entitled "Hardware/Software and Vendor Labor Integration in Pipeline Management" by Michael W. Kanemoto, et al.; and U.S. patent application Ser. No. 11/403,701 filed Apr. 13, 2006, entitled "Project Pipeline Management Systems and Methods Having Capital Expenditure/Expense Flip Targeting" by Margaret Knauth, et al., which are hereby incorporated by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Development projects in enterprises may include several sub-divisions or tasks to be completed. The work of completing tasks may be divided into several phases, and the several tasks making up a project may be expected to complete corresponding phases at the same time. Personnel, such as organization leaders, may estimate the amount of resources needed during a development project so that adequate resources are available to make timely progress in each of the work phases. Resources may include hours to be worked by appropriately skilled developers and/or costs including overhead costs, software tool leasing costs, training costs, and other expenditure costs. The amount of resources needed for a project may vary from one phase to the next phase. Depending on the size, the scope, and the complexity of the projects, the needed resources may vary from one project to the next.

SUMMARY

Some embodiments provide a system for project pipeline risk management. The system includes a processor, a user interface, a data store, a distribution tool, and a risk tool. The data store includes completed project information. The distribution tool, when executed by the processor, generates project resource distributions for associated organizations, wherein each of the project resource distributions includes allocations of project resources to project phases and corresponds to one of multiple projects. The risk tool, when executed by the processor, identifies risks, wherein each of the identified risks corresponds to one of the projects. The risk tool also determines an initial risk exposure for each project based on an initial probability for each identified risk and an initial impact severity for each identified risk. Additionally, the risk tool determines an updated risk exposure for each of the projects based on an updated probability for each identified risk and an updated impact severity for each identified risk. The distribution tool also generates updated project resource distributions based on the completed project information and a difference between the initial risk exposure and the updated risk exposure for each project. Additionally, the distribution tool outputs the updated project resource distributions to the user interface.

Some embodiments provide a method for project pipeline risk management. Completed project information is recorded. Project resource distributions are generated for associated organizations, wherein each of the project resource distributions includes allocations of project resources to project phases and corresponds to one of multiple projects. Risks are identified, wherein each identified risk corresponds to one of the projects. An initial risk exposure for each project is determined based on an initial probability for each identified risk and an initial impact severity for each identified risk. An updated risk exposure for each project is determined based on an updated probability for each identified risk and an updated impact severity for each identified risk. Updated project resource distributions are generated and output based on completed project information and a difference between the initial risk exposure and the updated risk exposure for each project.

Some embodiments provide another method for project pipeline risk management. A weight is assigned to each deliverable associated with each of multiple projects. A project role is assigned to each organization for each deliverable. A deliverable weight is determined for each organization for each deliverable based on the weight assigned to each deliverable and the project role assigned to each organization for each deliverable. A schedule percentage of each deliverable is assigned to each project phase associated with each of the plurality of projects. A workload rate is determined for each deliverable for each organization for each of the plurality of projects based on the deliverable weight and the schedule percentage. A project resource percentage to be expended in each project phase by each organization is estimated based on the workload rate determined for one project. A project resources budget is estimated for the one project. A distribution of project resources to each project phase for the one project is generated based on the project resource percentage and the project resource budget for the one project. The distribution of project resources for each of the plurality of projects is summed to generate project resource distributions. Completed project information is recorded. Risks are identified, wherein each identified risk corresponds to one of multiple projects. An initial risk exposure is determined for each project based on an initial probability for each identified risk and an initial impact severity for each identified risk. An updated risk exposure is determined for each project based on an updated probability for each identified risk and an updated impact severity for each identified risk. Updated project resource distributions are generated and output based on completed project information and a difference between the initial risk exposure and the updated risk exposure for each project.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 3 shows a completed project information table according to some embodiments of the present disclosure.

FIG. 4 shows another completed project information table according to some embodiments of the present disclosure.

FIG. 5 shows risk tables according to some embodiments of the present disclosure.

FIG. 6A shows a project deliverable table for organizations according to some embodiments of the present disclosure.

FIG. 6B shows a revised project deliverable table for organizations according to some embodiments of the present disclosure.

FIG. 6C shows a further revised project deliverable table for organizations according to some embodiments of the present disclosure.

FIG. 7A shows an organization's deliverable table for project phases according to some embodiments of the present disclosure.

FIG. 7B shows an organization's revised deliverable table for project phases according to some embodiments of the present disclosure.

FIG. 8A shows a project resources distribution table for a project according to some embodiments of the present disclosure.

FIG. 8B shows a revised project resources distribution table for a project according to some embodiments of the present disclosure.

DETAILED DESCRIPTION OF THE PREFERRED EMBODIMENTS

Figure 1:
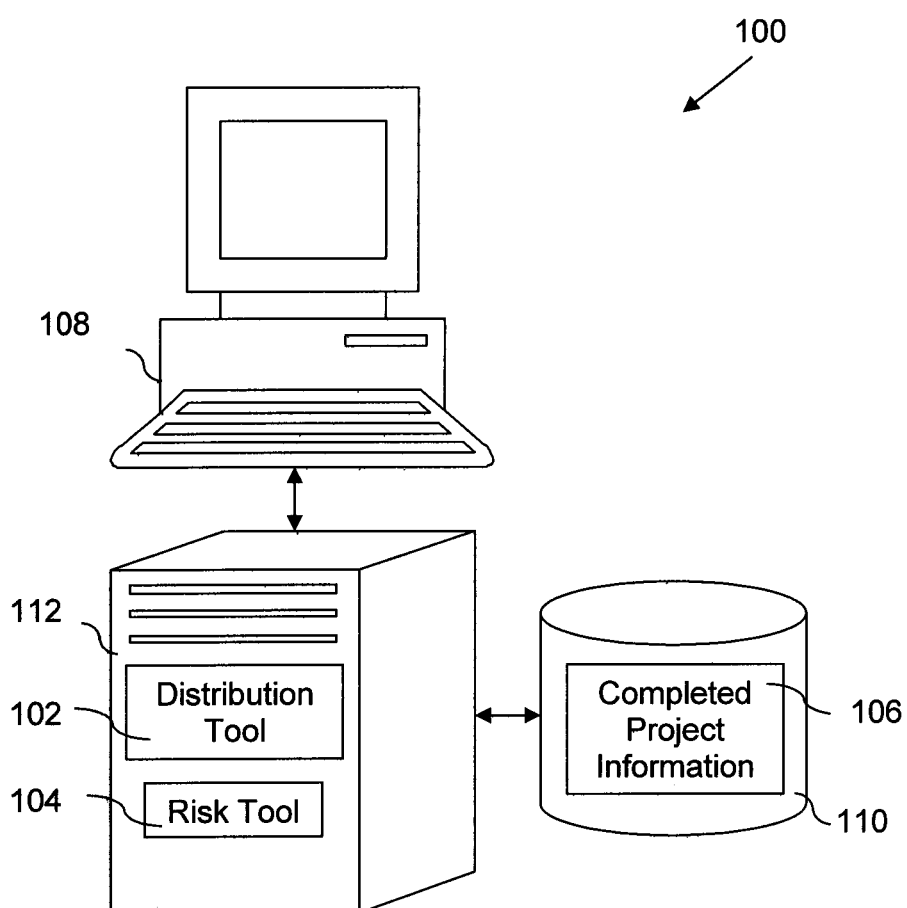
FIG. 1 shows a system for project pipeline risk management according to some embodiments of the present disclosure.

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

Projecting needed resources can be difficult and challenging for large projects and for large enterprises. Furthermore, project assessments may determine that some projects are at a risk for not completing on schedule or for overrunning their budget. Some of these projects at risk may subsequently need an allocation of additional resources to complete on time and within budget, but predicting which projects at risk will eventually need extra resources is difficult at best.

A distribution tool generates resource distributions that specify each organization's allocation of resources to the phases of each project in a pipeline. A risk tool identifies risks for each project and estimates an initial risk exposure for each project based on each identified risk's initial probability and initial impact severity. A risk exposure, such as low, medium, or high risk, can identify a project's risk for not completing on schedule or for overrunning its budget. Occasionally, such as once a week and/or once a month, the risk tool estimates an updated risk exposure for each project based on each identified risk's updated probability and updated impact severity. The distribution tool can use historical project data and any change in projects' risk exposures to generate updated resource distributions. For example, if 25% of all completed high risk exposure projects needed an allocation of additional resources to complete on schedule and within budget, and the project pipeline currently contains 40 projects that have become high risk exposures, the development tool estimates that 10 of these 40 projects will need additional resources. Even though the specific projects that will need the additional resources cannot be currently identified, the development tool can still allocate the additional resources to various organizations and project phases based on the organizations and project phases that historically needed additional resources for high risk exposure projects to complete on time and within budget. Similarly, the development tool can estimate the additional resources that will be needed by the medium risk exposure projects currently in the pipeline based on historical data for medium risk exposure projects. By adjusting resource allocations for organizations and project phases based on changing project risks and historical project data, the allocation of additional resources can be anticipated and scheduled before the extra resources are needed, thereby increasing the chances of projects completing on schedule and within budget.

FIG. 1 shows a system 100 for project pipeline risk management according to some embodiments of the present disclosure. The system 100 includes a distribution tool 102, a risk tool 104, completed project information 106, and a user interface 108. The completed project information 106 is stored on a data store 110, and both the distribution tool 102 and the risk tool 104 may execute on a server 112.

The distribution tool 102 generates resource distributions that specify each organization's allocation of resources to the phases of each project in a pipeline. An example of an enterprise's resource distribution is discussed below in reference to FIG. 2. The distribution tool 102 may generate a custom defined resource distribution for a specific project. Generating a custom-defined resource distribution is discussed below in reference to FIG. 6, FIG. 7, FIG. 8, and boxes 902-916 of FIG. 9. The distribution tool 102 may also generate resource distributions based on an analysis of projects completed during a specified time period, such as the average levels of effort expended in the project phases for all of the projects listed in the completed project information 106, or for the projects completed in the last six months. The system 100 may manage project pipeline risks for any procedure used to generate the resource distributions.

Occasionally, such as once a week and/or once a month, the distribution tool 102 can use the completed project information 106 and any changes in projects' risk exposures to generate updated resource distributions. The distribution tool 102 outputs the initial and updated resource distributions to the user interface 108 for staff review. An updated resource distribution may include a suggestion for staff to execute a mitigation response plan, which may result in changes in allocated resources, schedule changes, scope changes, quality changes, and/or budget changes for selected projects.

The risk tool 104 identifies risks for projects in the pipeline and calculates a risk exposure for each project based on each project's risk probabilities and impact severities. Calculating risk exposures based on risk probabilities and impact severities are discussed below in reference to FIG. 5. After calculating an initial risk exposure for each project, the risk tool occasionally calculates an updated risk exposure for each project. When a number of project's risk exposures change more than a predefined amount, the distribution tool 102 can use these changes and the additional resources needed by projects with similar risk exposure changes to generate updated resource distributions.

The completed project information 106 includes information about historical projects, such as the additional resources needed by projects with similar risk exposure changes, risk exposures, risk differences, missed deadlines, budget overruns, quality changes, and/or scope changes. Examples of tables from the completed project information 106 are discussed below in reference to FIG. 3 and FIG. 4.

Although depicted as separate from the server 112, the functions and the capabilities of the data store 110 may be partially or completely combined with the server 112. The server 112 may be implemented on a general purpose computer. General purpose computer systems are discussed in more detail below in reference to FIG. 10.

Figure 2:
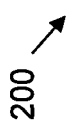
FIG. 2 shows a project resources distribution table according to some embodiments of the present disclosure.

FIG. 2 shows a project resources distribution table 200 according to some embodiments of the present disclosure. The table 200 depicts the resources allocated by each organization to each project phase for all of the projects in a pipeline. The table 200 includes an organizations column 202, a pipeline hours column 204, a concept phase column 206, an analysis phase column 208, a design phase column 210, a development phase column 212, a test phase column 214, and a launch phase column 216. The table 200 also includes a service delivery row 218, a network operations row 220, a network engineering row 222, a management network operations row 224, a network development row 226, and a field engineering operations row 228. However, the table 200 may include columns 202-216 for any number and types of project phases and rows 218-228 for any number and types of enterprise organizations. The project phases in table 200 may specify levels of effort allocated by the organizations 202 to the phases of each project based on hours, days, weeks, or months. For example, the data stored in the service delivery row 218 and the concept phase column 206 indicate that 120 staffing hours are allocated for the service delivery organization during the concept phases for all of the projects in the pipeline. The pipeline hours column 204 sums the resources allocated for the project phases by the organizations 202 in the columns 206-216.

FIG. 3 shows a completed project information table 300 according to some embodiments of the present disclosure. The table 300 indicates how often projects eventually completed on time when these projects developed a high, or urgent, risk exposure during various project phases. The table 300 includes a "project phase when status turned red" column 302, a "frequency in historical data" column 304, an "on time" column 306, a "likelihood project misses commit date" column 308, and a "possible impact to levels of effort" column 310. The table 300 also includes an analysis phase row 312, a design phase row 314, a development phase row 316, a test phase row 318, a launch phase row 320, and an overall row 322. However, the table 300 may include rows 312-322 for any number and types of project phases and any number and types of columns 302-310. The completed project information 106 may include tables that correspond to each level of risk exposure, such as informative, cautionary, and urgent. In this example, the table 300 corresponds to an urgent level of risk exposure, which is identified as a "red" risk. The cautionary level of risk exposure may be identified as a "yellow" risk, while an informative level of risk exposure may be identified as a "green" risk.

Although the table 300 includes data that indicates how frequently historical projects with urgent, or red, risk exposure levels completed on time, the table 300 could indicate how frequently projects with urgent exposure levels completed within their budgets, completed without a change of scope, or completed without a change in quality. The design phase row 314 for the column 304 indicates that 3 out of the 4 projects that developed an urgent risk exposure during the corresponding design phases eventually completed on time. The test phase row 318 for the column 304 indicates that 2 out of the 6 projects that developed an urgent risk exposure during the corresponding test phases eventually completed on time.

The distribution tool 102 can use the table 300 to calculate an updated resource distribution. For example, the distribution tool 102 determines that 4 out of 6 projects (66.6%) that developed an urgent risk exposure during the corresponding test phases failed to complete on time because only 2 out of 6 projects that developed an urgent risk exposure during the corresponding test phases eventually completed on time. Therefore, the distribution tool 102 multiplies this 66.6% schedule failure rate for projects that developed urgent risks during the corresponding test phases by the 3 current pipeline projects that developed an urgent risk exposure during the corresponding test phases to estimate that 2 of these 3 current projects (66.6% multiplied by 3 equals 2) will miss their commit dates. Therefore, the distribution tool 102 may allocate additional resources based on historical data in the completed project information 106 to mitigate the risks for 2 projects failing to meet their commit dates. Alternatively, if the table 300 indicated how frequently projects with urgent exposure levels completed within their budgets, completed without a change of scope, or completed without a change in quality, the distribution tool 102 may change the schedule, the quality, or the scope to mitigate the risks associated with these projects.

The distribution tool 102 may allocate additional resources based on percentages associated with the completed project information 106. For example, the distribution tool 102 determines how many additional staffing hours were allocated to the 4 projects that developed an urgent risk exposure during the corresponding test phases and did not complete on time. The distribution tool 102 may compare the additional staffing hours to the originally allocated staffing hours for these 4 projects to determine a percentage increase for each of these 4 projects, such as additional allocations of 5%, 10%, 15%, and 10% of staffing hours for these 4 projects. The distribution tool 102 averages the percentage increases to determine an average percentage increase of 10% (5%+10%+15%+10%=40%; 40% divided by 4 projects=10% average) for the current pipeline projects that developed an urgent risk exposure during the corresponding test phases.

Because the current pipeline projects that would miss the commit data cannot be identified currently, the distribution tool 102 adds 10% to the original staffing hours for each of the 3 current pipeline projects that developed an urgent risk exposure during the corresponding test phases to estimate the allocation of additional resources for these 3 projects. However, because the completed project information 106 indicates that only 66.6% of these 3 projects may fail to meet their commit dates, the distribution tool 102 reduces the allocation of additional resources for the 3 projects to 66.6% of the estimated allocation to determine the allocation of additional resources for the 3 current pipeline projects that developed an urgent risk exposure during the corresponding test phases. Other methods of allocating additional resources based on the completed project information 106 will readily suggest themselves to those of ordinary skill in the art.

FIG. 4 shows another completed project information table 400 according to some embodiments of the present disclosure. The table 400 is substantially similar to table 300 in FIG. 3, and indicates how often projects eventually completed on time when these projects developed a medium, or cautionary, risk exposure during various project phases. Although the table 400 includes data that indicates how frequently historical projects with cautionary, or yellow, risk exposure levels completed on time, the table 400 could indicate how frequently projects with cautionary exposure levels completed within their budgets, completed without a change of scope, or completed without a change in quality.

The distribution tool 102 can use the table 400 to calculate an updated resource distribution. For example, the distribution tool 102 determines that 16 out of 30 completed projects (53.3%) that developed a cautionary risk exposure during the corresponding test phases failed to complete on time because only 14 out of 30 completed projects that developed a cautionary risk exposure during the corresponding test phases eventually completed on time. Therefore, the distribution tool 102 multiplies this 53.3% schedule failure rate for projects that developed a cautionary risk exposure during the corresponding test phases by the 15 current pipeline projects that developed a cautionary risk exposure during the corresponding test phases to estimate that 8 of these 15 current projects (53.36% multiplied by 15=8) will miss their commit dates. Therefore, the distribution tool 102 may allocate additional resources based on historical data in the completed project information 106 to mitigate the risks for the 8 projects that developed a cautionary risk exposure during the corresponding test phases to fail to meet their commit dates. Alternatively, if the table 300 indicated how frequently projects with cautionary exposure levels completed within their budgets, completed without a change of scope, or completed without a change in quality, the distribution tool 102 may change the schedule, the quality, or the scope to mitigate the risks associated with these projects.

Occasionally, the distribution tool 102 may output a report of a percentage of current projects that changed from one risk exposure level to another. For example, the report may indicate that 20% of the projects with a cautionary risk exposure during the month of January became projects with an urgent risk exposure during the month of February. Such a report may indicate how effectively project risks are being mitigated.

FIG. 5 shows risk tables 500 according to some embodiments of the present disclosure. A user of the system 100 may use the risk tables 500 to calculate initial and updated risk exposures for projects. The risk tool 104 may occasionally generate an updated risk exposure for a project, such as whenever there is a change in allocated resources, a scope change, a schedule change, a quality change, and/or a budget change. Generating an updated risk exposure based on such changes ensures that each project's risk exposure reflects the project's most recent information.

The risk tables 500 include a probability table 502, an impact severity table 504, and a risk exposure table 506. The probability table 502 includes an estimation of probability column 508, which offers descriptions of distinct levels for the probability of a risk becoming true. For example, the second row in the estimation of probability column 508 specifies "The risk has a low probability of occurring (one in four chances)." The second row of the estimation of probability column 508 may enable a user of the system 100 to analyze a risk as a low probability risk. Therefore, the user may agree to enter a corresponding probability 502 of 25% via the user interface 108 as the probability for a project's identified risk. The levels in the probability table 502 are typical of some embodiments, and for other embodiments the probability table 502 may include other levels.

The impact severity table 504 lists columns for each distinct level of a risk's impact severity, including columns for a very low level of impact severity 510, a low level of impact severity 512, a moderate level of impact severity 514, a high level of impact severity 516, and a very high level of impact severity 518. The impact severity table 504 also includes rows for each of the project impact types, such as cost 520, schedule 522, scope 524, and quality 526. A user of the system 100 may use the severity of impact table 504 to qualitatively assign the impact severity for a risk to a project. For example, the low column 512 for the schedule row 522 lists "schedule slippage is less than 5%." By using the severity of impact table 504, the user may qualitatively assign a low level of impact severity 512 for a risk to a project's schedule that may cause the schedule to slip by less than 5%. Because the low column 512 in the severity of impact table 504 corresponds to the value of 2, the user may enter the value of 2 via the user interface 108 for the impact severity of a risk for a project. The levels in the severity of impact table 504 are typical of some embodiments, but in other embodiments the severity of impact table 504 may include other levels.

The exposure table 506 includes columns for probabilities and rows for impacts to indicate the possible combinations of the impact severity and the probability. For example, a column for 25% probability and a row for an impact of 2 indicate an exposure of 0.50. The exposure table 506 indicates that this risk exposure of 0.50 corresponds to a green level of risk exposure. Values for risk exposure may be categorized into discrete levels of risk exposures, such as informative, cautionary, and urgent levels, and these levels may be displayed as various colors that call appropriate attention to the risk exposure. For example, the exposure table 506 indicates that exposure values from 0.10 to 0.90 correspond to the informative or green level, exposure values from 1.00 to 2.50 correspond to the cautionary or yellow level, and exposure values of 2.70 to 4.50 correspond to the urgent or red level. The levels in the exposure table 506 are typical of some embodiments, but in other embodiments the exposure table 506 may include other levels.

The risk tool 104 may identify many different risks for a project, and calculate a risk exposure for each of the identified risks. The project's risk exposure is based on the highest risk exposure calculated for the project's identified risks. For example, if the risk tool identifies 3 risks for a project, and calculates the corresponding risk exposures as 0.50 (green), 1.80 (yellow), and 3.60 (red), the project's risk exposure is 3.60 (red) because the 3.60 (red) risk puts the project at the greatest risk of not completing on time or within budget.

When the risk tool 104 calculates an updated risk exposure for a project, the distribution tool 102 may use the difference between the project's initial and updated risk exposures to generate an updated resource distribution for the project. If the project's updated resource distribution differs from the project's initial resource distribution, then the distribution tool 102 also updates the resource distribution for the project pipeline. The differences between a project's initial and updated risk exposures may be based on a difference in the estimated risk exposures and/or a difference in levels associated with various risk exposures. For example, the distribution tool 102 uses the difference between the project's initial risk exposure of 0.50 and its updated risk exposure of 1.0. In another example, the distribution tool 102 uses the difference between the project's initial risk exposure level of green and its updated risk exposure level of yellow.

As discussed above in reference to FIG. 1, a project's resource distributions may be based on historical data from the completed project information 106 for similar projects, or custom defined for those projects that may not conform to a typical resource distribution. For example, an architecture project may consume all of the resources allocated during the concept, analysis, and design phases. In another example, a project to develop embedded software to execute on a processor adapted to a special environment and employing specialized interfaces may consume more resources in the development phase due to additional system integration activities. Users of the system 100 may define these custom project resource distributions using a spreadsheet program or other data entry mechanism, for example entering an arbitrary percentage for each of the project phases, the sum of the percentages adding up to 100%. Alternatively, users may follow any other method for generating a custom resource distribution, such as the resource distribution generation that is illustrated in FIG. 6, FIG. 7, and FIG. 8 and outlined in boxes 902 to 918 in FIG. 9.

FIG. 6A shows a deliverable table 600 for organizations according to some embodiments of the present disclosure. The table 600 includes a ringtone project deliverables column 602, a weight column 604, a service delivery column 606, a network operations column 608, a network engineering column 610, a management network operations column 612, a network development column 614, and a field engineering operations column 616. The table 600 also includes a requirements traceability row 618, an architecture requirements row 620, an engineering requirements row 622, a DTS row 624, a design requirements row 626, a DIT row 628, and an ASD row 630. However, the table 600 may include columns 602-616 for any number and types of organizations and rows 618-630 for any number and types of deliverables. The table 400 in FIG. 4 depicts examples of data for deliverables developed by enterprise organization for a mobile phone ringtone project.

A deliverable is a physical output or result that is created as a result of work on a project. Deliverables include work products, such as the intended results of project work. Deliverables also include management products, such as the documents used to manage the project. Even if many steps are added or subtracted from a project plan, each deliverable remains unchanged.

A user employs the user interface 108 to assign a weight to each deliverable associated with each project, where the weight approximates the relative amount of resources required for a deliverable. For example, the architecture requirements row 620 and the engineering requirements row 622 for the weight column 604 indicate that the user entered a "3" for the weight 604 of the architecture requirements 620 and a "2" for the weight 604 of the engineering requirements 622.

A user also employs the user interface 108 to assign a project role to each organization for each deliverable. Although the example depicted in FIG. 6A uses the responsible-accountable-consulted-informed (RACI) diagram, other methods or systems for assigning project roles may be used. RACI is a diagram used to describe the project roles and responsibilities of various teams or people in developing a project. RACI diagrams may be especially useful in clarifying project roles and responsibilities in cross-functional/departmental projects and processes.

A user may assign an "R," or responsible, to organizations that work to achieve the corresponding deliverable. There can be multiple organizations responsible for a deliverable. A user may assign an "A," or accountable to the organization that is ultimately answerable for the correct and thorough completion of the deliverable. Typically, only one "accountable" is assigned for each deliverable. A user may assign a "C," or consulted, to those organizations whose opinions are sought via two-way communication. A user may assign an "I," or informed, to those organizations that are kept up-to-date on progress towards the deliverable via one-way communication. For example, the architecture requirements row 620 and the engineering requirements row 622 for the network operations column 608 indicates that the user entered an "A," or accountable, for the project role of the architecture requirements deliverable 620 and an "R," or responsible, for the project role of the engineering requirements deliverable 622.

FIG. 6B shows a revised deliverable table 600 for organizations according to some embodiments of the present disclosure. The table 600 in FIG. 6B is substantially similar to the table 600 in FIG. 6A. The RACI project roles from FIG. 6A are replaced by corresponding RACI numerical values in FIG. 6B. For example, each "R," or responsible, in FIG. 6A is replaced by a RACI numerical value of "2" in FIG. 6B. Likewise, each "A," or accountable is replaced by a RACI numerical value of "3," each "C," or consulted, is replaced by a RACI numerical value of "1," and each "1," or informed, is replaced by a RACI numerical value of "1." These replacements enable the table 600 in FIG. 6B to reflect the relative numerical values that correspond to the project roles assigned to each organization for each deliverable in FIG. 6A.

FIG. 6C shows a further revised deliverable table 600 for organizations according to some embodiments of the present disclosure. The table 600 in FIG. 6C is substantially similar to the table 600 in FIG. 6B. The distribution tool 102 determines a deliverable weight for each organization for each deliverable based on the weight assigned to each deliverable and the project role assigned to each organization for each deliverable. For example, the distribution tool 102 multiplies the weight 604 of "3" for the architecture requirements row 620 by the RACI numerical value of "3" for the architecture requirements row 620 for the network operations column 608 in FIG. 6B to produce a deliverable weight of "9," which is listed in the architecture requirements row 620 for the network operations column 608 in FIG. 6C. Each deliverable weight is a combination of the relative weight assigned to a corresponding deliverable and the RACI numerical value assigned to an organization for that deliverable. Each deliverable weight may be understood as a relative estimate of the resources that an organization will allocate to a deliverable.

FIG. 7A shows an organization's deliverable table 700 for project phases according to some embodiments of the present disclosure. The table 700 depicts the network development 614 organization's deliverables that are distributed across the ringtone project's phases. Each of the other organizations 606-612 and 616 may be associated with a table that is similar to the table 700. The table 700 includes a network development ringtone project deliverables column 702, a concept phase column 704, an analysis phase column 706, a design phase column 708, a development phase column 710, a test phase column 712, and a launch phase column 714. The table 700 also includes a requirements traceability row 716, an architecture requirements row 718, an engineering requirements row 720, a DTS row 722, a design requirements row 724, a DIT row 726, an ASD row 728, and a phase total row 730. However, the table 700 may include columns 702-714 for any number and types of project phases and rows 716-730 for any number and types of deliverables. A user may employ the user interface 108 to assign a schedule percentage of each deliverable to each project phase for a project developed by an organization, such as the ringtone project phases for the network development organization. The percentage may be a user's estimate or based on the completed project information 106 that indicate what percentages of deliverables were completed in which project phases for similar completed projects. For example, the user enters "100%" in the requirements traceability row 716 for the concept phase column 704 because the user estimates that all of the work for the requirements traceability deliverable 716 is completed during the concept phase 704. Alternatively, the completed project information 106 indicates that 100% of the requirements traceability deliverable 716 was completed in the concept phase 704 for completed projects similar to the ringtone project.

FIG. 7B shows an organization's revised deliverable table 700 for project phases according to some embodiments of the present disclosure. The table 700 in FIG. 7B is substantially similar to the table 700 in FIG. 7A. The distribution tool 102 determines a workload rate for each deliverable for a project supported by an organization based on the deliverable weight and the schedule percentage. The workload rate for each deliverable for an organization may be the product of multiplying a deliverable weight, such as those depicted in FIG. 6C, by its corresponding schedule percentage, such as those depicted in FIG. 7A. For example, the architecture requirements row 620 for the network development column 614 in FIG. 6C indicates a deliverable weight of "6." Continuing this example, the architecture requirements row 718 for the concept phase column 704 and the analysis phase column 706 in FIG. 7A indicate that 80% of the architecture requirements 718 are completed in the concept phase 704 and 20% of the architecture requirements 718 are completed in the analysis phase 706. Multiplying the 80% of the architecture requirements 718 that are completed in the concept phase 704 by the deliverable weight of "6" for the network development organization's architecture requirements 620 results in 4.8 (80% of 6=4.8), which is the workload rate entered in the architecture requirements row 718 for the concept phase column 704 in FIG. 7B. Similarly, multiplying the 20% of the architecture requirements 718 that are completed in the analysis phase 706 by the deliverable weight of "6" for the network development organization's architecture requirements 620 results in 1.2 (20% of 6=1.2), which is the workload rate entered in the architecture requirements row 718 for the analysis phase column 706 in FIG. 7B.

The workload rates in FIG. 7B are based on multiplying each schedule percentage of FIG. 7A by the corresponding deliverable weight listed for each of the network development organization's deliverables in FIG. 6C. The workload rates for each phase are summed in the phase total row 730 to indicate the relative amount of resources that an organization allocates to each phase of a project. Summing the workload rates for each project phase results in the workload rates listed in the phase total row 730 for the columns 704-714. The phase total row 730 indicates a phase total workload rate of 10.8 (6+4.8=10.8) for the concept phase 704, a phase total workload rate of 3.2 (1.2+2=3.2) for the analysis phase 706, and a phase total workload rate of 10.1 (2+3.6+4.5=10.1) for the design phase 708. The phase total row 730 also indicates a phase total workload rate of 12.7 (2.4+4.5+4.8+1=12.7) for the development phase 710, a phase total workload rate of 2.2 (1.2+1=2.2) for the test phase 712, and a phase total workload rate of 0.0 for the launch phase 714.

FIG. 8A shows a project resources distribution table according to some embodiments of the present disclosure. The table 800 in FIG. 8A is substantially similar to the table 200 in FIG. 2. The percentages in FIG. 8A represent the workload rate percentages for each organization's allocation to each phase of the ringtone project. The percentages for the network development organization 226 are based on the workload rates depicted in FIG. 7B for the network development organization for each phase of the ringtone project. The percentages for the organizations 218-224 and 228 are based on tables of the workload rates for the ringtone project that are similar to those depicted in FIG. 7B. The distribution tool 102 sums each of the phase total workload rates in FIG. 7B to produce a project workload rate for the network development organization for the ringtone project, which enables the production of a workload rate percentage for the network development organization. For example, the project workload rate for table 700 in FIG. 7B is 39.0 (10.8+3.2+10.1+12.7+2.2+0.0=39.0 for the phase total row 730). The distribution tool 102 may divide the phase total workload rate for each project phase by the project workload rate to calculate a project resource percentage for each project phase. For example, because 10.8 of the 39.0 project workload rate are allocated to the concept phase 704, the distribution tool 102 allocates 27.7% (10.8 is 27.7% of 39.0) of the network development 226 organization's resources for the ringtone project to the concept phase 206, as indicated by the network development row 226 and the concept phase column 206. In another example, the data in the service delivery row 218 for the concept phase column 206 indicates that 15% of the service delivery organization's resources are allocated for the concept phase 206 of the ringtone project.

FIG. 8B shows a revised project resources distribution table according to some embodiments of the present disclosure. The table 800 in FIG. 8B is substantially similar to the table 800 in FIG. 8A. The values for the columns 206-216 in FIG. 8B are the product of the multiplication of the pipeline hours 204 by the corresponding percentages for the columns 206-216 in FIG. 8A. For example, the data in the network development row 226 for the pipeline hours column 204 indicates that the network development organization 226 allocates a total of 100 staffing hours to the ringtone project. Continuing this example, the data in the network development row 226 for the concept phase column 204 indicates that the network development organization 226 allocates 27.7 staffing hours (27.7% of 100 equals 27.7) to the ringtone project's concept phase 206.

In another example, the data in the service delivery row 218 for the pipeline hours column 204 and the concept phase column 206 in FIG. 8A indicates that the service delivery organization allocates a total of 80 staffing hours to the ringtone project and that 15% of the service delivery organization's resources are allocated to the concept phase 206 of the ringtone project. Therefore, the data in the service delivery row 218 for the concept phase column 206 in FIG. 8B indicates that the service delivery organization allocates 12 staffing hours to the concept phase 206 of the ringtone project (15% of 80 hours=12 hours). Although FIG. 8B represents organizations' resource allocations for one project, the organizations' resource allocations for each project in the pipeline may be summed to produce the resources that each organization allocates for each phase of each project in the pipeline, such as the data depicted in table 200 of FIG. 2.

Figure 9:
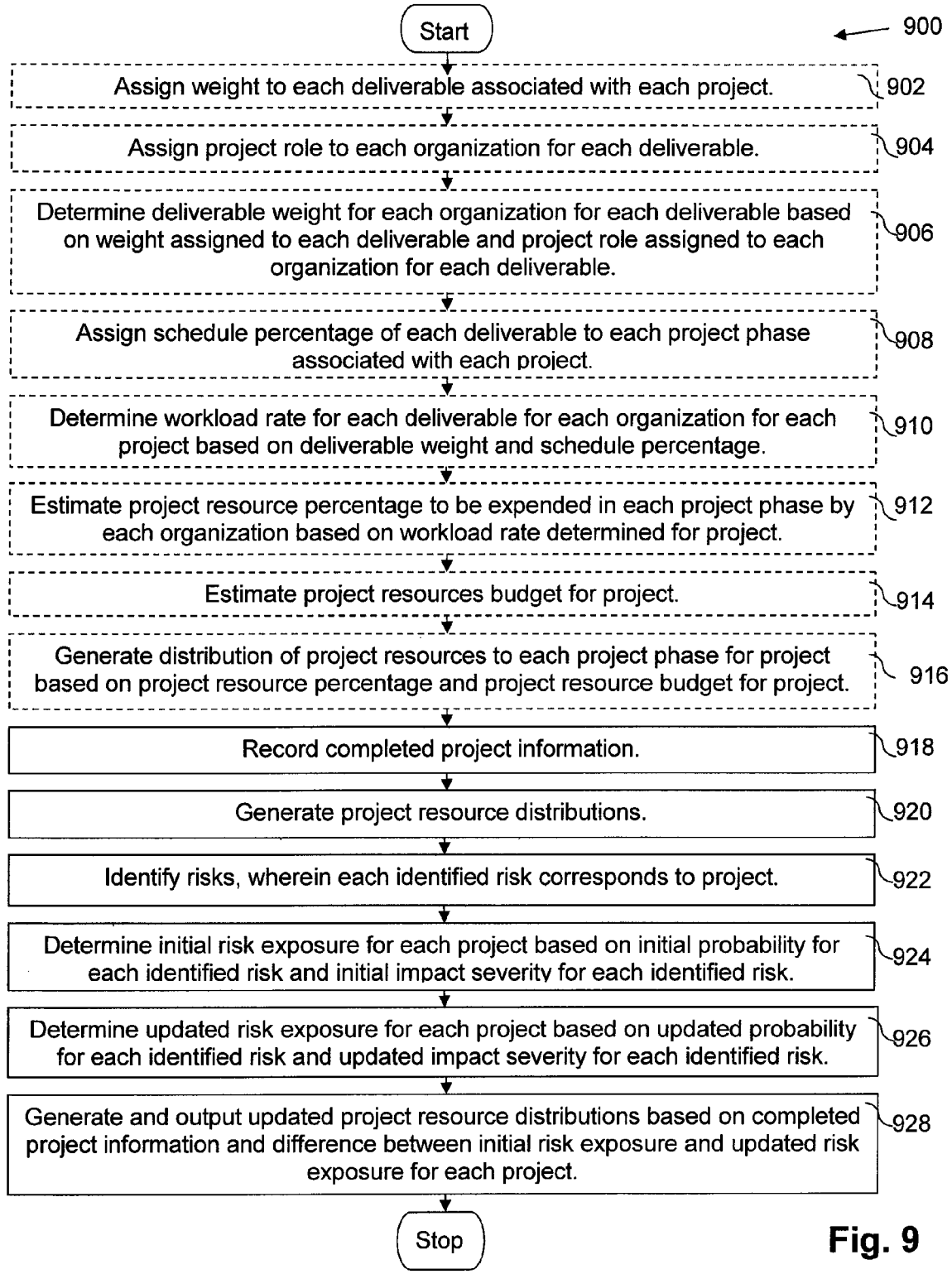
FIG. 9 is a flowchart for a project pipeline risk management method according to some embodiments of the present disclosure.

FIG. 9 shows a flowchart of a method 900 for project pipeline risk management according to some embodiments of the present disclosure. The system 100 can execute the method 900 to update resource distributions for projects in a pipeline based on risk exposure changes for the projects.

In box 902, a weight is optionally assigned to each deliverable associated with each project. For example, the user employs the user interface 108 to assign the weights depicted in the weight column 604 of FIG. 6A.

In box 904, project roles are optionally assigned to each organization for each deliverable. For example, the user employs the user interface 108 to assign the RACI. project roles depicted for the columns 606-616 in FIG. 6A.

In box 906, deliverable weights are optionally determined for each organization for each deliverable based on weights assigned to each deliverable and project roles assigned to each organization for each deliverable. For example, the distribution tool 102 calculates the deliverable weights depicted in the columns 606-616 in FIG. 6C.

In box 908, schedule percentages of each deliverable are optionally assigned to each project phase associated with each project. For example, the user employs the user interface 108 to assign the schedule percentages depicted in the columns 704-714 in FIG. 7A.

In box 910, workload rates are optionally determined for each deliverable for each organization for each project based on deliverable weights and schedule percentages. For example, the distribution tool 102 determines the workload rates depicted in the columns 704-714 in FIG. 7B.

In box 912, project resource percentages to be expended in each project phase by each organization are optionally estimated based on workload rates determined for a project. For example, the distribution tool 102 estimates the project resource percentages depicted in columns 206-216 in FIG. 8A.

In box 914, a project resources budget is optionally estimated for a project. For example, the user employs the user interface 108 to enter the estimates that are depicted for the pipeline hours column 204 in FIG. 8A.

In box 916, a distribution of project resources to each project phase for a project is optionally generated based on project resource percentage and project resource budget for the project. For example, the distribution tool 102 generates a distribution of project resources that is depicted in the columns 204 to 216 in FIG. 8B.

In box 918, completed project information is recorded. For example, the data store 110 records the completed project information 106.

In box 920, project resource distributions are generated. For example, the distribution tool 102 generates the distribution of project resources that is depicted in the table 200 in FIG. 2 based on the completed project information 106. Alternatively, the distribution tool 102 sums the distribution of project resources for each project, such as table 800 in FIG. 8B, to generate the table 200 depicted in FIG. 2.

In box 922, risks are identified, wherein each identified risk corresponds to a project. For example, the risk tool 104 enables the user of the user interface 108 to identify risks for the ringtone project.

In box 924, an initial risk exposure for each project is determined based on an initial probability and an initial impact severity for each identified risk. For example, the risk tool 104 determines an initial risk exposure of 0.5, which corresponds to informative or green, for the ringtone project based on an initial probability of 25% and an initial impact severity of low, which corresponds to "2," as depicted in FIG. 5 by the tables 500.

In box 926, an updated risk exposure for each project is determined based on an updated probability and an updated impact severity for each identified risk. For example, the risk tool 104 determines an updated risk exposure of 1.0, which corresponds to cautionary or yellow, for the ringtone project based on an updated probability of 50% and an updated impact severity of low, which corresponds to "2," as depicted in FIG. 5 by the tables 500.

In box 928, updated project resource distributions are generated and output based on completed project information and a difference between an initial risk exposure and an updated risk exposure for each project. For example, the distribution tool 102 generates and outputs an updated project resource distribution, such as table 200 in FIG. 2, based on the completed project information 106 and the difference between the initial green risk exposure and the updated yellow risk exposure for the ringtone project. Alternatively, the updated project resource distribution may be based on the difference between the initial 0.50 risk exposure and the updated 1.0 risk exposure for the ringtone project.

Figure 10:
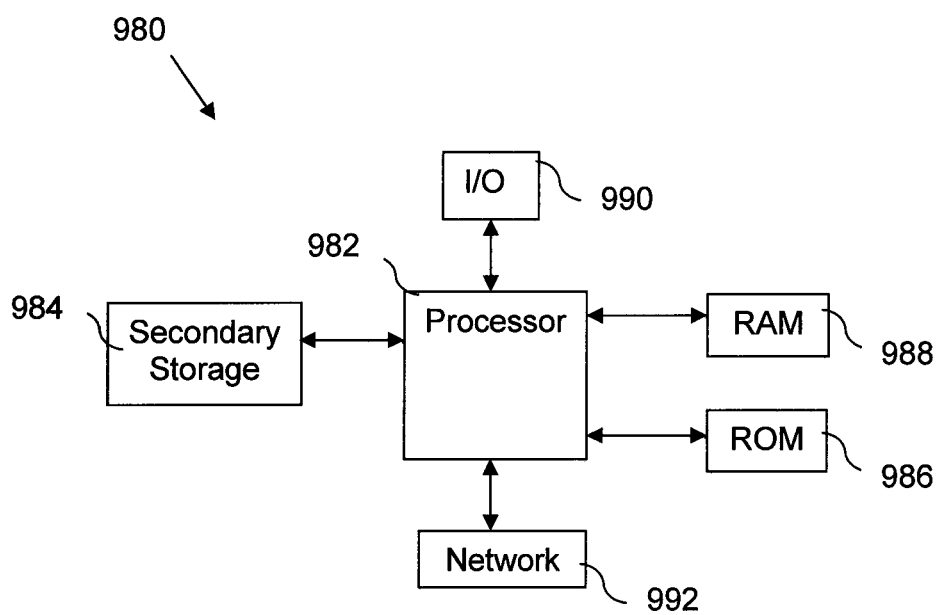
FIG. 10 illustrates an exemplary general purpose computer system suitable for implementing the several embodiments of the disclosure.

Some aspects of the system described above may be implemented on any general-purpose computer with sufficient processing power, memory resources, and network throughput capability to handle the necessary workload placed upon it. FIG. 10 illustrates a typical, general-purpose computer system suitable for implementing one or more embodiments disclosed herein. The computer system 980 includes a processor 982 (which may be referred to as a central processor unit or CPU) that is in communication with memory devices including secondary storage 984, read only memory (ROM) 986, random access memory (RAM) 988, input/output (I/O) devices 990, and network connectivity devices 992. The processor 982 may be implemented as one or more CPU chips.

The secondary storage 984 is typically comprised of one or more disk drives or tape drives and is used for non-volatile storage of data and as an over-flow data storage device if RAM 988 is not large enough to hold all working data. Secondary storage 984 may be used to store programs which are loaded into RAM 988 when such programs are selected for execution. The ROM 986 is used to store instructions and perhaps data which are read during program execution. ROM 986 is a non-volatile memory device which typically has a small memory capacity relative to the larger memory capacity of secondary storage 984. The RAM 988 is used to store volatile data and perhaps to store instructions. Access to both ROM 986 and RAM 988 is typically faster than to secondary storage 984.

I/O devices 990 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 992 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), and/or worldwide interoperability for microwave access (WiMAX) radio transceiver cards, and other well-known network devices. These network connectivity devices 992 may enable the processor 982 to communicate with an Internet or one or more intranets. With such a network connection, it is contemplated that the processor 982 might receive information from the network, or might output information to the network in the course of performing the above-described method steps. Such information, which is often represented as a sequence of instructions to be executed using processor 982, may be received from and outputted to the network, for example, in the form of a computer data signal embodied in a carrier wave.

Such information, which may include data or instructions to be executed using processor 982 for example, may be received from and outputted to the network, for example, in the form of a computer data baseband signal or signal embodied in a carrier wave. The baseband signal or signal embodied in the carrier wave generated by the network connectivity devices 992 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 982 executes instructions, codes, computer programs, scripts which it accesses from hard disk, floppy disk, optical disk (these various disk based systems may all be considered secondary storage 984), ROM 986, RAM 988, or the network connectivity devices 992. While only one processor 982 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for project pipeline risk management for software development projects in an enterprise, comprising:
    a data store comprising completed project historical information associated with a plurality of completed software development projects, wherein the completed project historical information comprises data that indicates how often software development projects that developed risk exposure changes to higher risk exposure levels in each of a plurality of project phases met a deadline or completed within a budget;
    a user interface;
    a processor;
    a risk tool, when executed by the processor, to:
        identify risks, wherein each of the identified risks corresponds to one of a plurality of current pipeline software development projects,
        determine an initial risk exposure for each of the plurality of current pipeline software development projects based on an initial probability for each identified risk and an initial impact severity for each identified risk, and
        determine an updated risk exposure for each of the plurality of current pipeline software development projects based on an updated probability for each identified risk and an updated impact severity for each identified risk, and
    a distribution tool, when executed by the processor, to:
        generate project resource distributions for associated organizations, wherein each of the project resource distributions comprises allocations of project resources to each of the plurality of project phases and corresponds to one of the plurality of current pipeline software development projects,
            wherein the plurality of project phases comprise a concept phase, an analysis phase, a design phase, a development phase, a test phase, and a launch phase;
        generate updated project resource distributions for each current pipeline software development project of a subset of the plurality of current pipeline software development projects that developed a risk exposure change to a higher risk exposure level during one of the plurality of project phases based on the completed project historical information and a difference between the initial risk exposure and the updated risk exposure for each of the plurality of current pipeline software development projects,
        wherein the updated project resource distributions are generated by allocating anticipated additional resources before the additional resources are needed to each current pipeline software development project of the subset of the plurality of current pipeline software development projects based on an analysis of the additional resources allocated to completed software development projects of a subset of the plurality of completed software development projects so as to mitigate risks that each current pipeline software development project of the subset of the plurality of current pipeline software development projects will not meet a deadline or will overrun a budget,
        wherein the completed software development projects of the subset of the plurality of completed software development projects developed the same risk exposure change to the same higher risk exposure level during the same one of the plurality of project phases and missed a deadline or overran a budget, and
        wherein allocating the anticipated additional resources to each current pipeline software development project of the subset of the plurality of current pipeline software development projects comprises performing at least one calculation on the additional resources allocated to completed projects of the subset of the plurality of completed software development projects and applying a result of the at least one calculation to the originally allocated resources for each current pipeline software development project of the subset of the plurality of current pipeline software development projects, and
        output the updated project resource distributions to the user interface.

2. The system of claim 1 wherein the completed project historical information comprises at least one of risk exposures, risk differences, missed deadlines, budget overruns, quality problems, and scope changes associated with completed projects.

3. The system of claim 1 wherein the project resource distributions comprise levels of effort allocated into units of time that are one of hours, days, weeks, and months.

4. The system of claim 1 wherein at least one of the initial risk exposure and the updated risk exposure comprises discrete levels of risk exposure corresponding to informative, cautionary, and urgent.

5. The system of claim 1 wherein at least one of the initial risk exposure and the updated risk exposure is a product of a probability for a corresponding risk and an impact severity for the corresponding risk.

6. The system of claim 1 wherein at least one of the initial probability and the updated probability comprises discrete levels of probability corresponding to a very low probability of occurring, a low probability of occurring, a moderate probability of occurring, a high probability of occurring, and a very high probability of occurring.

7. The system of claim 1 wherein at least one of the initial impact severity and the updated impact severity comprises discrete levels of impact severity corresponding to a very low impact severity, a low impact severity, a moderate impact severity, a high impact severity, and a very high impact severity.

8. A computer implemented method for project pipeline risk management for software development projects in an enterprise, comprising:

recording completed project historical information associated with a plurality of completed software development projects, wherein the completed project historical information comprises data that indicates how often projects that developed risk exposure changes to higher risk exposure levels in each of a plurality of project phases met a deadline or completed within a budget;

generating, by a distribution tool stored on a non-transitory computer readable medium and executable by a processor, project resource distributions for associated organizations, wherein each of the project resource distributions comprises allocations of project resources to each of a plurality of project phases and corresponds to one of a plurality of current pipeline software development projects, wherein the plurality of project phases comprise a concept phase, an analysis phase, a design phase, a development phase, a test phase, and a launch phase;

identifying, by a risk tool stored on a non-transitory computer readable medium and executable by a processor, risks, wherein each identified risk corresponds to one of the plurality of current pipeline software development projects;

determining, by the risk tool, an initial risk exposure for each of the plurality of current pipeline software development projects based on an initial probability for each identified risk and an initial impact severity for each identified risk;

determining, by the risk tool, an updated risk exposure for each of the plurality of current pipeline software development projects based on an updated probability for each identified risk and an updated impact severity for each identified risk; and generating and outputting, by the distribution tool, updated project resource distributions for each current pipeline software development project of a subset of the plurality of current pipeline software development projects that developed a risk exposure change to a higher risk exposure level during one of the plurality of project phases based on the completed project historical information and a difference between the initial risk exposure and the updated risk exposure for each of the plurality of current pipeline software development projects by allocating anticipated additional resources before the additional resources are needed to each of the current pipeline software development project of the subset of the plurality of current pipeline software development projects based on an analysis of the additional resources allocated to completed software development projects of a subset of the plurality of completed software development projects so as to mitigate risks that each current pipeline project of the subset of the plurality of current pipeline software development projects will not meet a deadline or will overrun a budget, wherein the completed software development projects of the subset of the plurality of completed software development projects developed the same risk exposure change to the same higher risk exposure level during the same one of the plurality of project phases as each current pipeline software development project of the subset of the plurality of current pipeline software development projects, and missed a deadline or overran a budget, wherein allocating the anticipated additional resources to each current pipeline software development project of the subset of the plurality of current pipeline software development projects comprises performing at least one calculation on the additional resources allocated to completed software development projects of the subset of the plurality of completed software development projects and applying a result of the at least one calculation to the originally allocated resources for each current pipeline software development project of the subset of the plurality of current pipeline software development projects.

9. The computer implemented method of claim 8 wherein generating the project resource distributions is based on analysis of projects completed during a specified time period.

10. The computer implemented method of claim 8 wherein the project resource distributions are custom defined.

11. The computer implemented method of claim 8 wherein the project resource distributions comprise levels of effort expended in the project phases based at least in part on averages of levels of effort expended in the project phases for completed projects.

12. The computer implemented method of claim 8 wherein determining the updated risk exposure is based on one of a change request, a change in allocated resources, a scope change, a schedule change, a quality change, and a budget change.

13. The computer implemented method of claim 8 wherein generating the updated project resource distributions comprises outputting a suggestion to execute a mitigation response plan for selected projects.

14. The computer implemented method of claim 8 wherein generating the updated project resource distributions further comprises occasionally outputting a report of a percentage of current pipeline software development projects that changed from a cautionary risk exposure to an urgent risk exposure.

15. The computer implemented method of claim 8 wherein the difference between the initial risk exposure and the updated risk exposure for each of the selected projects is greater than a specified difference.

16. A computer implemented method for project pipeline risk management for software development projects in an enterprise, comprising:

assigning a weight to each deliverable associated with each of a plurality of current pipeline software development projects;

assigning a project role to each organization for each deliverable;

determining, by a distribution tool stored on a non-transitory computer readable medium and executable by a processor, a deliverable weight for each organization for each deliverable based on the weight assigned to each deliverable and the project role assigned to each organization for each deliverable;

assigning a schedule percentage of each deliverable to each phase of a plurality of project phases associated with each of the plurality of current pipeline software development projects;

determining, by the distribution tool, a workload rate for each deliverable for each organization for each of the plurality of current pipeline software development projects based on the deliverable weight and the schedule percentage;

estimating, by the distribution tool, a project resource percentage to be expended in each of the plurality of project phases by each organization based on the workload rate determined for one project;

estimating a project resources budget for the one project;

generating, by the distribution tool, a distribution of project resources to each of the plurality of project phases for the one project based on the project resource percentage and the project resource budget for the one project,
 wherein the plurality of project phases comprise a concept phase, an analysis phase, a design phase, a development phase, a test phase, and a launch phase;

summing, by the distribution tool, the distribution of project resources for each of the plurality of current pipeline software development projects to generate project resource distributions;

recording completed project historical information associated with a plurality of completed software development projects, wherein the completed project historical information comprises data that indicates how often projects that developed risk exposure changes to higher risk exposure levels in each of a plurality of project phases met a deadline or completed within a budget;

identifying, by a risk tool stored on a non-transitory computer readable medium and executable by a processor, risks, wherein each identified risk corresponds to one of the plurality of current pipeline software development projects;

determining, by the risk tool, an initial risk exposure for each of the plurality of current pipeline software development projects based on an initial probability for each identified risk and an initial impact severity for each identified risk;

determining, by the risk tool, an updated risk exposure for each of the plurality of current pipeline software development projects based on an updated probability for each identified risk and an updated impact severity for each identified risk; and generating and outputting, by the distribution tool, updated project resource distributions for each current pipeline software development project of a subset of the plurality of current pipeline software development projects that developed a risk exposure change to a higher risk exposure level during one of the plurality of project phases based on the completed project historical information and a difference between the initial risk exposure and the updated risk exposure for each of the plurality of current pipeline software development projects by allocating anticipated additional resources before the additional resources are needed to each of the current pipeline software development project of the subset of the plurality of current pipeline software development projects based on an analysis of the additional resources allocated to completed software development projects of a subset of the plurality of software development completed projects so as to mitigate risks that each current pipeline software development project of the subset of the plurality of current pipeline software development projects will not meet a deadline or will overrun a budget, wherein the completed software development projects of the subset of the plurality of completed software development projects developed the same risk exposure change to the same higher risk exposure level during the same one of the plurality of project phases as each current pipeline software development project of the subset of the plurality of current pipeline software development projects, and missed a deadline or overran a budget, wherein allocating the anticipated additional resources to each current pipeline software development project of the subset of the plurality of current pipeline software development projects comprises performing at least one calculation on the additional resources allocated to completed software development projects of the subset of the plurality of completed software development projects and applying a result of the at least one calculation to the originally allocated resources for each current pipeline software development project of the subset of the plurality of current pipeline software development projects.

17. The computer implemented method of claim 16 wherein generating the distribution of project resources to each of the plurality of project phases for the one project further comprises determining a schedule for the one project based on a complexity score associated with the one project and a determined size associated with the one project, wherein the determined size is one of small, medium, large, and jumbo.

* * * * *